United States Patent
Youngs et al.

(10) Patent No.: US 8,364,126 B2
(45) Date of Patent: Jan. 29, 2013

(54) METHOD AND SYSTEM FOR PROVIDING TRANSMISSION OF SELECTED MEDIA PROGRAMS TO A WIRELESS SUBSCRIBER

(75) Inventors: Edward A. Youngs, Boulder, CO (US); Jafar Nabkel, Boulder, CO (US); Donald E. Gillespie, Boulder, CO (US); Harvey J. Benson, Highlands Ranch, CO (US); Karen Siegel-Jacobs, Boulder, CO (US)

(73) Assignee: Qwest Communications International Inc., Denver, CO (US)

(*) Notice: Subject to any disclaimer, the term of this patent is extended or adjusted under 35 U.S.C. 154(b) by 377 days.

(21) Appl. No.: 10/601,773

(22) Filed: Jun. 23, 2003

(65) Prior Publication Data
US 2004/0087302 A1 May 6, 2004

Related U.S. Application Data

(63) Continuation of application No. 09/447,138, filed on Nov. 22, 1999, now Pat. No. 6,600,918.

(51) Int. Cl.
*H04M 3/42* (2006.01)
*H04L 29/06* (2006.01)
*H04M 3/00* (2006.01)

(52) U.S. Cl. .............. 455/414.1; 455/414.3; 455/418

(58) Field of Classification Search ............. 455/414.1, 455/414.3, 418, 11.1, 3.04, 419, 556.1, 519, 455/413.3; 370/341, 319, 320, 321, 329, 370/322; 725/62, 105, 106, 123
See application file for complete search history.

(56) References Cited

U.S. PATENT DOCUMENTS

| | | | |
|---|---|---|---|
| 5,200,954 A * | 4/1993 | Teel et al. .............. 370/338 |
| 5,650,994 A * | 7/1997 | Daley ..................... 370/259 |
| 5,661,787 A * | 8/1997 | Pocock .................. 379/101.01 |
| 5,724,648 A | 3/1998 | Shaughnessy et al. |
| 5,835,860 A | 11/1998 | Diachina |
| 6,005,848 A | 12/1999 | Grube et al. |
| 6,014,569 A | 1/2000 | Bottum |
| 6,026,289 A * | 2/2000 | Zellner et al. ............ 455/403 |
| 6,097,963 A | 8/2000 | Boltz et al. |
| 6,167,255 A | 12/2000 | Kennedy, III et al. |
| 6,169,894 B1 * | 1/2001 | McCormick et al. ...... 455/414.1 |
| 6,178,166 B1 | 1/2001 | Wilson et al. |
| 6,236,832 B1 | 5/2001 | Ito |
| 6,246,430 B1 * | 6/2001 | Peters et al. ............ 348/14.01 |
| 6,253,091 B1 | 6/2001 | Naddell et al. |
| 6,275,500 B1 | 8/2001 | Callaway et al. |
| 6,373,829 B1 | 4/2002 | Vilmur |
| 6,377,560 B1 | 4/2002 | Dailey |
| 6,385,461 B1 | 5/2002 | Raith |
| 6,389,463 B2 | 5/2002 | Bolas et al. |
| 6,522,886 B1 | 2/2003 | Youngs et al. |
| 6,600,918 B1 * | 7/2003 | Youngs et al. ........... 455/414.3 |

(Continued)

OTHER PUBLICATIONS

U.S. Appl. No. 09/447,137, (US Patent No. 6,522,886), Non Final Office Action dated Jun. 5, 2002, 10 pages.

(Continued)

*Primary Examiner* — Christopher M Brandt
*Assistant Examiner* — Muthuswamy Manoharan
(74) *Attorney, Agent, or Firm* — Swanson & Bratschun, L.L.C.

(57) ABSTRACT

A method and system for providing transmission of a selected media program to a wireless handset includes a source provider, such as a wireless network or a wireless handset, for receiving a transmission from at least one media program provider. At least one wireless handset transmits a request selecting one of the media programs. In response thereto, the source provider simultaneously transmits the selected media program to each of the wireless handsets.

14 Claims, 3 Drawing Sheets

U.S. PATENT DOCUMENTS 6,829,475 B1 * 12/2004 Lee et al. .................. 455/419

OTHER PUBLICATIONS

U.S. Appl. No. 09/447,137, (US Patent No. 6,522,886), Final Office Action dated Aug. 26, 2002, 9 pages.
U.S. Appl. No. 09/447,137, (US Patent No. 6,522,886), Notice of Allowance dated Oct. 1, 2002, 3 pages.
U.S. Appl. No. 10/331,074, Non Final Office Action dated Nov. 4, 2004, 14 pages.
U.S. Appl. No. 09,447,138, (US Patent No. 6,600,918), Non Final Office Action dated Aug. 6, 2002, 9 pages.
U.S. Appl. No. 09,447,138, (US Patent No. 6,600,918), Non Final Office Action dated Dec. 4, 2002, 7 pages.
U.S. Appl. No. 09,447,138, (US Patent No. 6,600,918), Advisory Action dated Feb. 5, 2003, 3 pages.
U.S. Appl. No. 09,447,138 (US Patent No. 6,600,918), Notice of Allowance dated Mar. 10, 2003, 3 pages.

* cited by examiner

METHOD AND SYSTEM FOR PROVIDING TRANSMISSION OF SELECTED MEDIA PROGRAMS TO A WIRELESS SUBSCRIBER

CROSS-REFERENCE TO RELATED APPLICATION

This application is a continuation application of U.S. patent application Ser. No. 09/447,138 entitled "Method and System for Providing Transmission of Selected Media Programs to a Wireless Subscriber," filed Nov. 22, 1999 by Edward A. Youngs, et al., and is related to U.S. patent application Ser. No. 09/447,137 (now U.S. Pat. No. 6,522,886, issued on Feb. 18, 2003) entitled "Method and Systems for Simultaneously Sharing Wireless Communications Among Multiple Wireless Handsets," filed Nov. 22, 1999 by Edward A. Youngs, et al., the entire disclosure of each of which is herein incorporated by reference for all purposes.

TECHNICAL FIELD

This invention relates to methods and systems for providing multi-media transmission of selected media programs to a wireless subscriber.

BACKGROUND ART

Today, subscribers are restricted to two-way conversations on their wireless handsets or two-way data/paging services. There is no provision for one-way transmissions to wireless handsets of available media programs. For example, subscribers who are traveling between two points often miss an important segment of their favorite television program. Whether they are leaving their home in the morning, on their way to work, or driving between appointments during the day, these individuals may desire to at least hear the audio portion of their favorite television program, such as a sports broadcast, a talk show, or a soap opera.

Thus, there exists a need to deliver desired media programs to wireless subscribers via their wireless handsets.

SUMMARY OF THE INVENTION

It is a general object of the present invention to provide a multi-media transmission of a selected media program to a wireless subscriber via their wireless handsets.

In carrying out the above object and other objects, features, and advantages of the present invention, a method is provided for providing transmission of a selected media program to a wireless handset. The method includes receiving a transmission from at least one media program provider, receiving a request from a first wireless handset selecting one of the media programs, and transmitting the selected media program to the first wireless handset.

In further carrying out the above object and other objects, features, and advantages of the present invention, a system is also provided for carrying out the steps of the above described method. The system includes a wireless network for receiving a transmission from at least one media program provider. The system also includes a first wireless handset for transmitting a request selecting one of the media programs. The wireless network is further operative to transmit the selected media program to the first wireless handset.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
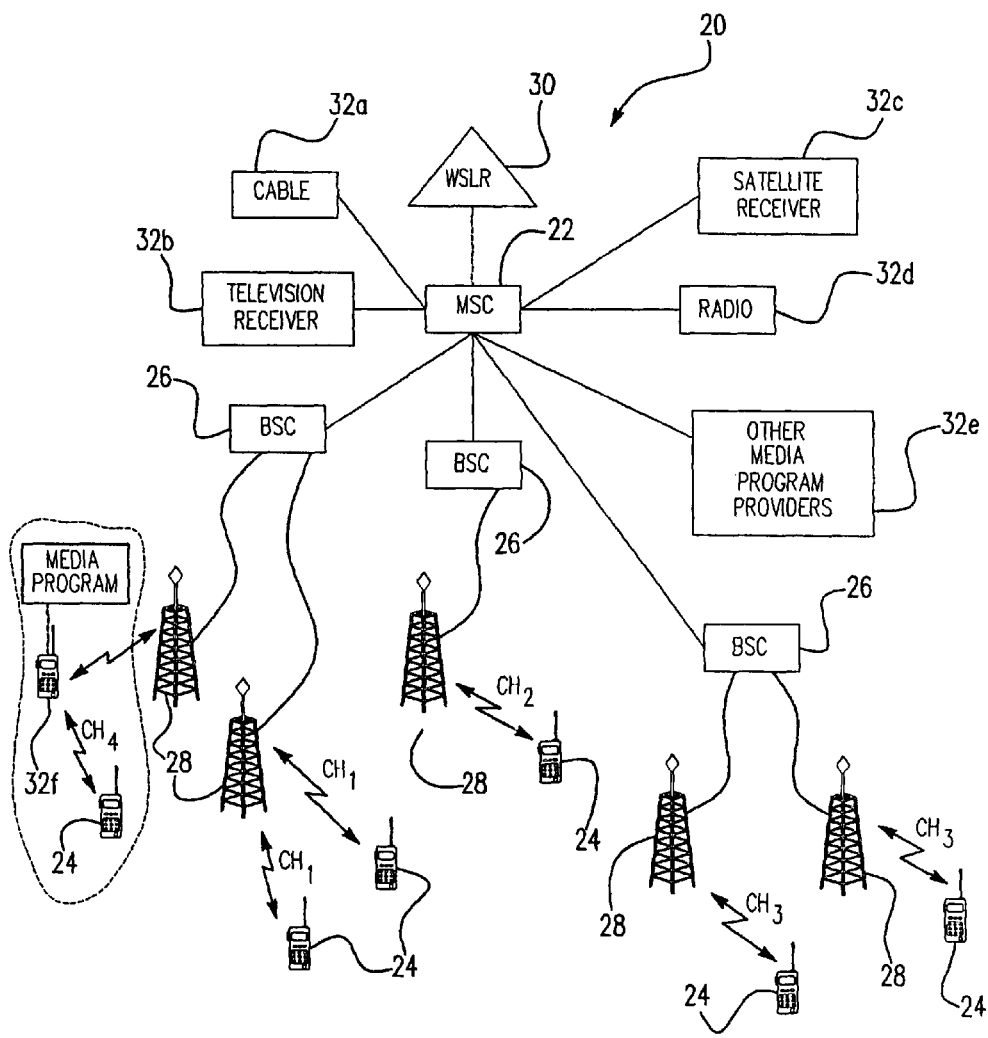
FIG. 1 is a schematic diagram of a wireless network system architecture incorporating the teachings of the present invention.
Figure 2:
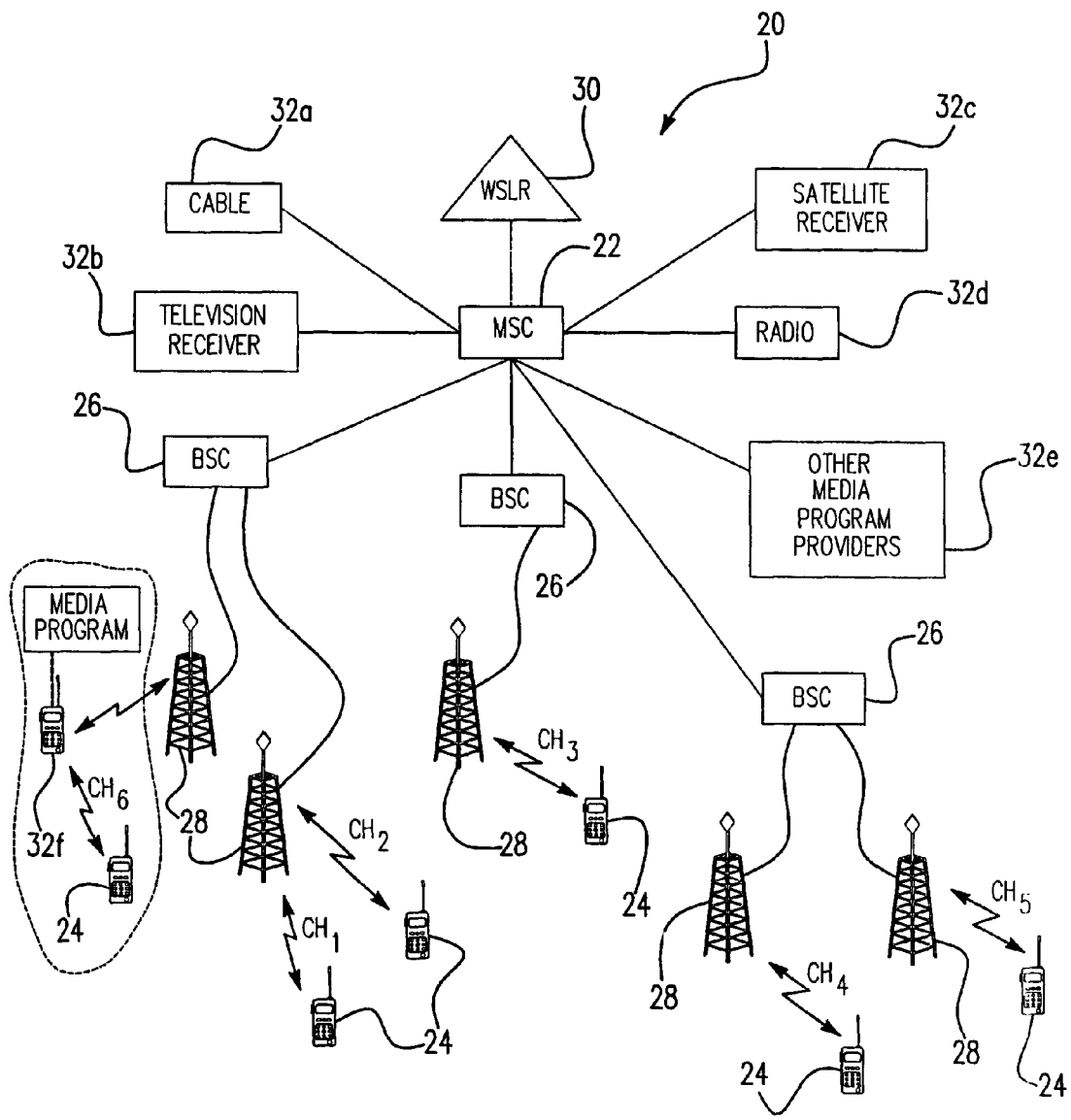
FIG. 2 is a schematic diagram of the wireless network system architecture shown in FIG. 1 operating according to an alternative embodiment of the present invention.

A schematic diagram of the system architecture of a wireless network 20 incorporating the teachings of the present invention is shown in FIGS. 1 and 2. The wireless network 20 typically includes a Mobile Switching Center (MSC) 22 for processing calls to and from the wireless users of the wireless network 20. MSC 22 is known to those skilled in the art as a digital telephone exchange that controls the switching between a wireline network and mobile cell sites for all wireline-to-mobile, mobile-to-wireline, and mobile-to-mobile calls. In operation, when MSC 22 receives a call from the wireline network that is directed to a wireless handset 24, MSC 22 deciphers the telephone number dialed by the originating caller and alerts Base Station Controllers (BSCs) 26 (described below) at one or more cell sites to page the corresponding wireless handset 24. Similarly, when wireless handset 24 places a call, MSC 22 accepts the dialing data from BSC 26 and uses the dialed number for routing the communication. MSC 22 also processes mobile registration status data received from BSC 26, switches calls to other cells, processes diagnostic information, and compiles mobile billing information.

Typical wireless networks include several coverage areas each including multiple adjoining cells. The BSC 26, which operates under the direction of MSC 22, serves each coverage area via a plurality of Base Stations (BSs) 28 disposed throughout each of the adjoining cells. The BSC 26 manages each of the radio channels assigned to its coverage area, supervises calls, turns the radio transceivers on and off, injects data onto control and user channels, and performs diagnostic tests on the cell site equipment.

To register a subscriber in the wireless network 20, MSC 22 ascertains whether a subscriber is present in the wireless network when the subscriber places a call via the wireless handset 24, receives a call via the wireless handset 24, or by automatic registration. Specifically, each time wireless handset 24 is powered on or a call is originated from wireless handset 24, certain information is transmitted to MSC 22, including a Mobile Identification Number (MIN), an Electronic Serial Number (ESN), and a System Identification (SID) of the wireless handset 24.

In order to respond to subscriber call requests, the MSC 22 compares the information transmitted by the wireless handset 24 with subscriber data contained in a database, referred to as a Wireless Subscriber Location Register 30. The WSLR 30 is a master database for storing data related to each mobile subscriber, such as the subscriber profile and mobility information together with their relevant permanent (static) data, such as access capabilities and subscriber services. WSLR 30 also contains location and service data for each visiting subscriber entering its coverage area in order to route incoming and outgoing calls appropriately. The WSLR 30 performs substantially the same functionality as the well known Home Location Register and Wireless Service Control Point, yet serves one or more MSCs 22 rather than only one MSC 22, as traditionally done in the prior art.

MSC 22 and WSLR 30 communicate with each other utilizing a signaling protocol, such as IS-41 Mobile Application Part (MAP) or GSM MAP. In some implementations, MSC 22 and WSLR 30 may be integrated into one component. The MSC 22 of the wireless network 20 is further connected to various media program providers 32, such as, but not limited to, cable, television, satellite, and radio. A media program provider may also include or be coupled to a source handset 32f for sending transmissions to other handsets either directly if they are located within direct communication proximity to the source handset 32f, or indirectly through the wireless network. The media program providers 32 can provide any kind of media including, but not limited to, audio, video, and data. The communication can also be a preestablished media program, either pre-recorded or live, such as a television or radio broadcast, as shown at block 32 in FIG. 1. For example, video communications may include sports programming delivered via a traditional broadcast or television provider or via the Internet. Similarly, data communications may include media such as an Internet web page, stock quotes or sports scores.

Figure 3:
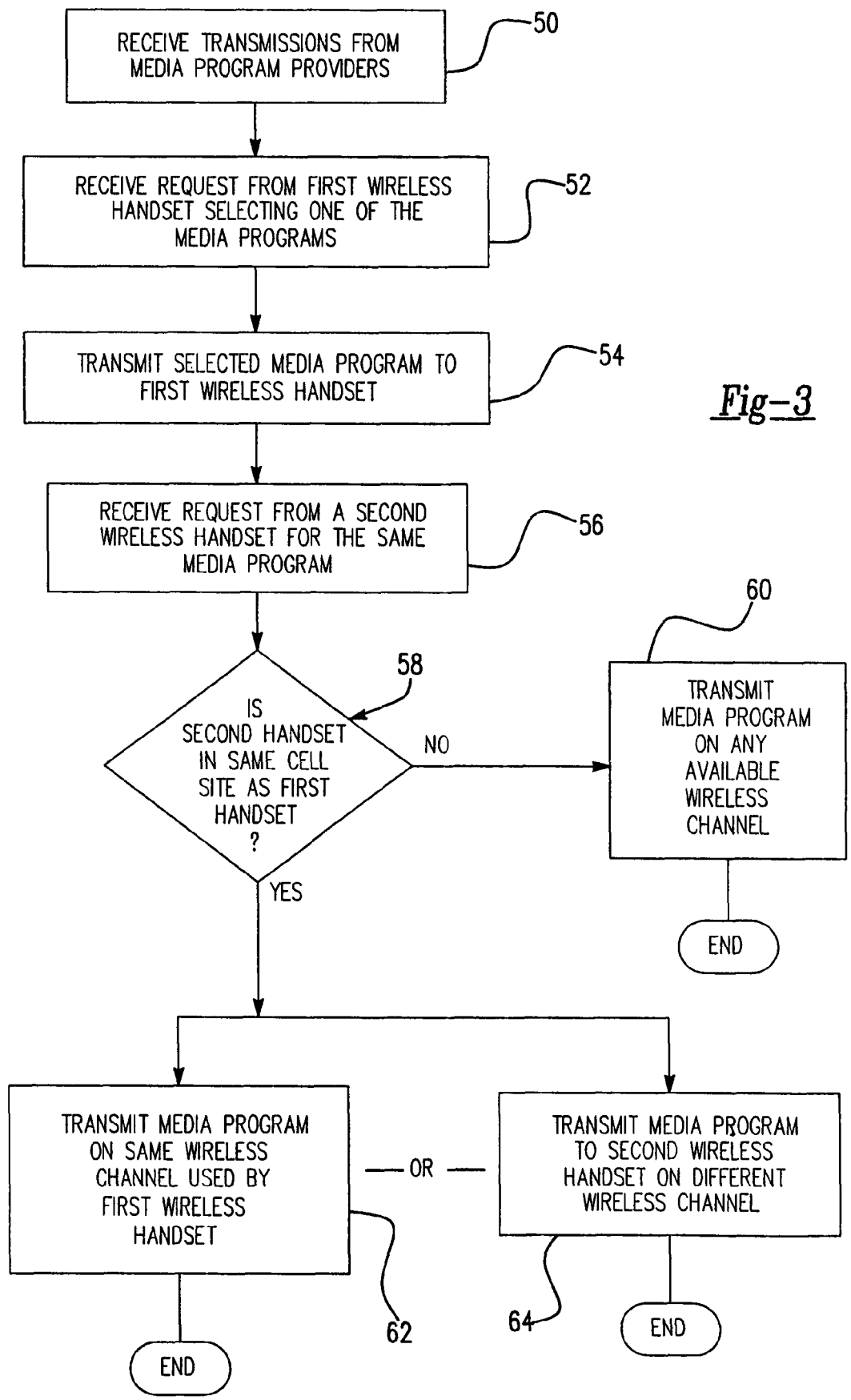
FIG. 3 is a flow diagram illustrating the general sequence of steps associated with the method of the present invention.

Turning now to FIG. 3, there is shown a flow diagram illustrating the general sequence of steps associated with the method of the present invention. The method begins with the wireless network receiving the transmissions from a plurality of media program providers, as shown at block 50. There may be some instances in which the wireless handset 24 can only receive a portion of the media program, such as the audio portion of an audio/video television transmission. In this case, the MSC 22 would only transmit the audio portion for transmission to the wireless handset 24.

Next, the MSC 22 receives a signal from wireless handset 24 selecting one of the media programs, as shown at block 52. In response to this request, MSC 22 then transmits the selected media program to the wireless handset 24, as shown at block 54.

It is possible that a second wireless handset 24 may request the same media program as the first wireless handset 24, as shown at block 56. Here, a determination is then made as to whether or not the second requesting wireless handset 24 is located in the same wireless cell site, as shown at conditional block 58. If not, MSC 22 then transmits the selected media program to the second wireless handset 24 via any available wireless channel in that cell site, as shown at block 60, and in FIG. 2.

If, however, the second requesting wireless handset 24 is located in the same cell site as the first wireless handset 24, MSC 22 may transmit the audio portion in one of two ways. In the first embodiment, MSC 22 transmits the selected media program to the second handset 24 via the same wireless channel as the first handset, as shown at block 62, and in FIG. 1. Here, the second wireless handset 24 is instructed to tune to the same Wireless channel that the first wireless handset 24 is tuned to. This may be the same time or frequency channel depending on whether the communication scheme is a TDMA (time division multiple access) scheme, a FDMA (frequency division multiple access) scheme, a CDMA (code division multiple access) scheme, or an otherwise designated channel.

Alternatively, MSC 22 may transmit the selected media program to the second handset 24 via a different wireless channel than that being used for the first wireless handset 24, as shown at block 64, and in FIG. 2. Here, the media program is multiplexed into separate wireless channels for each subscriber, even if two or more subscribers have requested the same media program.

Thus, the wireless network 20 provides a linkage between media program providers 32 and wireless handsets 24 in real-time. The system supports multiple subscribers requesting the same program at any point in time as well as multiple subscribers all requesting different programs simultaneously. The subscriber receives the media program as a one-way "phone call" with no return audio path. The subscriber does, however, have a return data-command path through which they can "dial" (e.g., press 7 or 35) another program and immediately receive the selected media program, or use their handset to place a regular phone call.

Selection of this type of communication can be accomplished in one of several ways. The subscriber could enter a well-known number or letter designation for the desired program. For example, "7" or "43" for a TV-cable program, or "1650" or "630" for a radio program (FM/AM). Alternatively, if a unique mapping for programs in a particular area can be achieved, then the subscriber could enter "KBCO" or "KUSA" to designate the station's call letters. This approach assumes the user knows the numbers for desired programs or has reference to a printed Program Listing Guide or some equivalent.

Still further, the handset 24 could present the subscriber with a list of available programs on the handset display or with an auditory list. The subscriber would then simply select the desired program and the MSC 22 would execute the needed functions to request that program. The handset 24 would provide the needed "navigation" and "search" features for the subscriber to review the entire list, find specific programs, mark/save favorite programs, etc. via arrow and scroll buttons, or other navigation mechanisms known to those skilled in the art.

The "menu" of program options could be presented to the subscriber via the handset either by having the "menu" built into the handset 24 at the time of manufacture, or by dynamically creating the "menu" for the subscriber whenever the subscriber enters a "program request" mode. In this instance, the handset 24 and the MSC 22 would exchange commands that dynamically transmit the currently available program list for the area the user is in directly to the handset 24.

In yet another embodiment, the subscriber could use the handset 24 to dial a specific "phone" number that would either access a special directory that would prompt the subscriber with program options or the wireless system could designate a different phone number for each program. Finally, the subscriber could use the handset 24 to dial a special "code" number that corresponds to a particular channel, similar to the codes used in the TV-Guide VCR-programming approach.

While the best modes for carrying out the invention have been described in detail, those familiar with the art to which this invention relates will recognize various alternative designs and embodiments for practicing the invention. This includes various architectures for constructing the wireless network. In some situations, the functionality of the MSC may be combined with a wireline network switch. In others, the intelligence for routing wireless calls is distributed to BSCs or other wireless network elements thereby eliminating the MSC as a discrete element. The teachings of this invention may be practiced with these and other embodiments as defined by the following claims.

What is claimed is:

1. A method for providing transmission of a selected media program to a plurality of wireless handsets deployed in a wireless network having at least one cell site coverage area associated therewith, the method comprising:
   receiving a first request to receive a selected media program from a first wireless handset in a first cell site coverage area, the request corresponding to a selection from a list of available media programs presented to a subscriber on a display of the wireless handset;
   establishing a wireless channel upon which to broadcast the selected media program in the cell site coverage area;
   broadcasting the selected media program to the first wireless handset over the wireless channel as a one-way phone call having no return audio-path, wherein, if it is determined that the first wireless handset can receive only a portion of the media program, broadcasting the selected media program comprises transmitting only the portion of the media program that the first wireless handset can receive;
   establishing a return data-command path over the wireless channel adapted to receive a media selection or a phone call from the first wireless handset;
   receiving a second request to receive the selected media program from a second wireless handset;
   determining whether the second wireless handset is located within the first cell site coverage area; and
   transmitting the selected media program to the second wireless handset, based on a determination of whether the second wireless handset is located within the first cell site coverage area.

2. The method as recited in claim 1, wherein the selected media program comprises a selection from a group consisting of: a cable program, a television program, a satellite program, and a radio program.

3. The method as recited in claim 1, wherein the selected media program comprises a pre-recorded media program.

4. The method as recited in claim 1, wherein the selected media program comprises a real-time transmission.

5. The method as recited in claim 1, wherein the selected media program comprises a selection from a group consisting of: audio program, video program, and data transmission.

6. The method as recited in claim 1, wherein:
   determining whether the second handset is located within the first cell site coverage area comprises determining that the second wireless handset is not located within the first cell site coverage area; and
   transmitting the selected media program to the second wireless handset comprises transmitting the selected media program using an available wireless channel in a second cell site coverage area in which the second wireless handset is located.

7. The method as recited in claim 1, wherein:
   determining whether the second handset is located within the first cell site coverage area comprises determining that the second wireless handset is located within the first cell site coverage area; and
   transmitting the selected media program to the second wireless handset comprises transmitting the selected media program using second wireless channel upon which to transmit the selected media program.

8. A system for providing transmission of a selected media program to a plurality of wireless handsets deployed in a wireless network having at least one cell site coverage area associated therewith, the system comprising:
   a source provider configured to receive a transmission of a media program from at least one media program provider, the source provider being further operative to broadcast the selected media program to a first wireless handset in a first cell site coverage area, via a wireless channel; and
   a wireless network configured to broadcast the selected media program from the source provider to the first wireless handset;
   wherein the source provider is further configured to:
   in response to a request for a requested media program, the request corresponding to a selection from a list of available media programs presented to a subscriber on a display of the handset, establish a wireless channel upon which to broadcast the requested media program in the cell site coverage area;
   broadcast the requested media program to the wireless handset over the wireless channel as a one-way phone call having no return audio-path, wherein, if it is determined that the first wireless handset can receive only a portion of the media program, broadcasting the selected media program comprises transmitting only the portion of the media program that the first wireless handset can receive;
   establish a return data-command path over the wireless channel adapted to receive a media selection or a phone call from the wireless handset;
   receive a second request to receive the selected media program from a second wireless handset;
   determine whether the second wireless handset is located within the first cell site coverage area; and
   transmit the selected media program to the second wireless handset based on a determination of whether the second wireless handset is located within the first cell site coverage area.

9. The system as recited in claim 8, wherein the source provider is the wireless network.

10. The system as recited in claim 8, wherein the requested media program comprises a pre-recorded media program.

11. The system as recited in claim 8, wherein the requested media program comprises a real-time transmission.

12. The system as recited in claim 8, wherein the requested media program comprises a selection from a group consisting of: a cable program, a television program, a satellite program, and a radio program.

13. The system as recited in claim 8, wherein the requested media program comprises a selection from a group consisting of: audio program, video program, and data transmission.

14. The system as recited in claim 8, wherein a wireless network communication scheme comprises a selection from a group consisting of: TDMA, FDMA, and CDMA.

* * * * *